April 1, 1924.
J. WILLIAMSON
CHANDELIER FIXTURE
Filed July 14, 1922
1,488,658
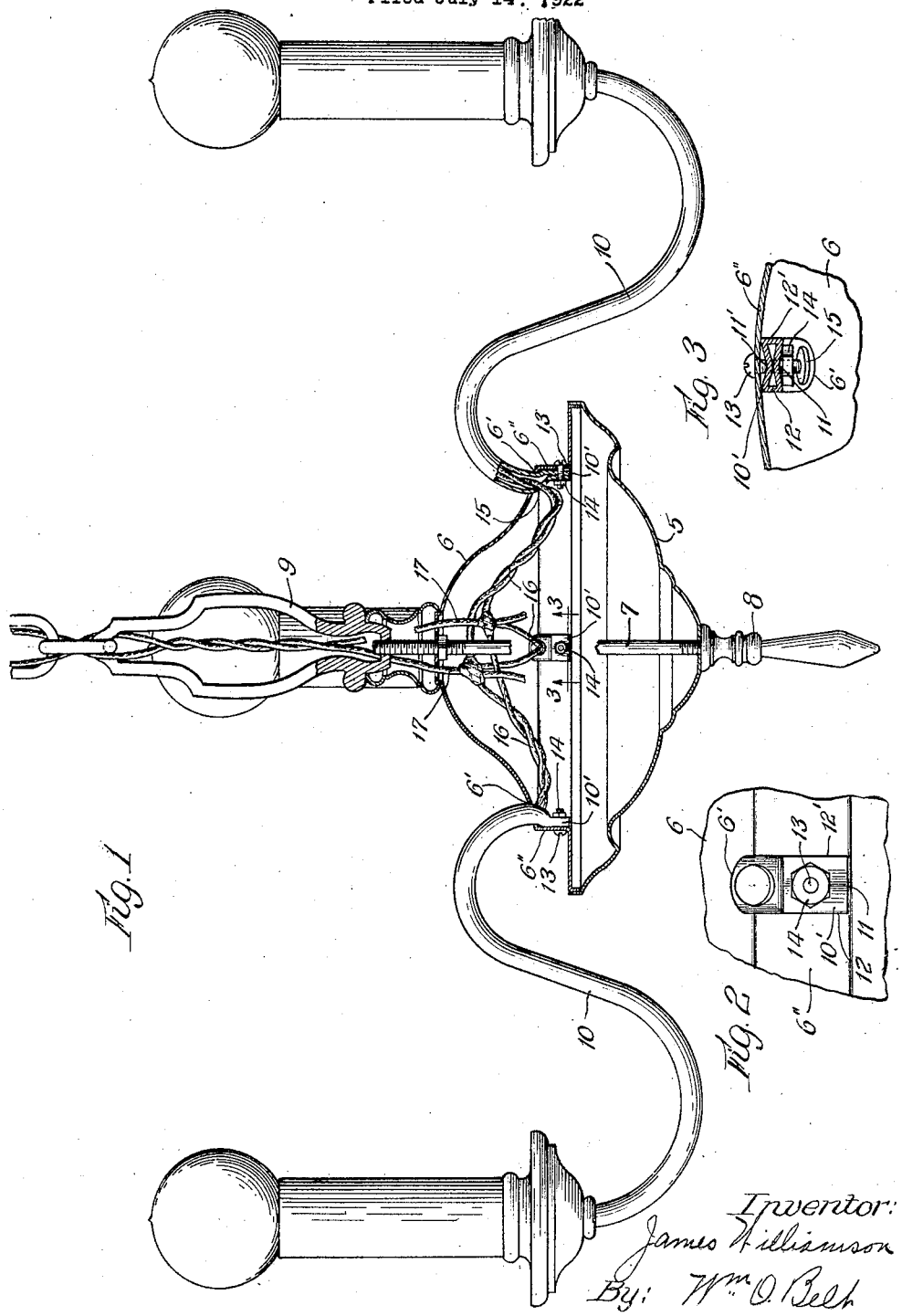
Inventor:
James Williamson
By: Wm. O. Belt
Atty.

Patented Apr. 1, 1924.

1,488,658

UNITED STATES PATENT OFFICE.

JAMES WILLIAMSON, OF CHICAGO, ILLINOIS, ASSIGNOR TO R. WILLIAMSON & COMPANY, OF CHICAGO, ILLINOIS, A CORPORATION OF ILLINOIS.

CHANDELIER FIXTURE.

Application filed July 14, 1922. Serial No. 575,054.

*To all whom it may concern:*

Be it known that I, JAMES WILLIAMSON, a citizen of the United States, residing at Chicago, in the county of Cook and State of Illinois, have invented certain new and useful Improvements in Chandelier Fixtures, of which the following is a specification.

This invention has for its object to improve the manner of securing the arms to the body of a chandelier fixture whereby they may be readily and easily secured rigidly in place against lateral or other movement.

A further object of the invention is to avoid the necessity for employing threaded nipples and other parts heretofore required for securing the arms to the body of a chandelier fixture and to enable these parts to be fastened together by ordinary stove bolts in a firm and rigid manner so that the arms will not readily become loosened or disarranged after once being adjusted and secured in place.

And a further object of the invention is to provide for securing the arms to the body of a chandelier fixture in such a manner and with such simple means that ample space will be provided for making the proper electrical connections within the body of the chandelier.

In the accompanying drawings I have illustrated a selected embodiment of the invention and referring thereto Fig. 1 shows a chandelier, partly in section, with the arms secured to the body in accordance with my invention;

Figs. 2 and 3 are enlarged detail sectional views.

Referring to the drawings the body 5 is provided with a removable close fitting top portion 6 which is held in place by the rod 7 connected at its ends to the knob 8 and to the loop 9. This top is provided with openings 6′, one for each arm 10, and suitably spaced from each other to provide for the distribution of the arms symmetrically about the body. Each arm 10 is made of tubular metal and bent to an artistic shape and its end is inserted through an opening 6′ to engage the annular band 6″ forming part of the top 6. The inner end 10′ of the arm is swaged to provide front and rear faces 11—11′ which are to some extent caved in as more clearly shown in Fig. 3. The side walls 12—12′ of the swaged end of the arm are substantially parallel and substantially flat. An ordinary stove bolt 13 passes through the annular band 6″ and the swaged end of the arm and carries a nut 14 whereby the arm is rigidly secured to the top. The caved or depressed front face 11 of the swaged end of the arm engages the inner face of the annular band 6″ and the nut engages the caved or depressed inner face of the swaged end of the arm. By swaging the end of the arm in this way I provide along each side wall of each face a longitudinally extending shoulder and the two shoulders of the outer face engage the annular band 6″ while the two shoulders on the inner face are engaged by the nut, whereby a non-slipping and non-loosening fastening is provided which holds the arm in fixed position. The nut engages the shoulders of the inner face of the swaged end of the arm, adjacent the side walls making therewith a locked nut engagement which prevents loosening. The arm is provided above the swaged end with an opening 15 through which the electric wires 16 pass for electrical connection with the stem wires 17.

The invention is simple in construction and it is simple in character, it provides a strong and rigid connection between the body top and the arm, it dispenses with the necessity for the employment of plates, nipples and distributors heretofore commonly used for this purpose and it leaves ample room to work on the wire. My invention also enables me to make the top of a size to fit snugly in the lower portion of the body thereby providing a substantially tight body which gives a finished and enclosed appearance.

The invention is susceptible of various changes in the form, proportion and arrangement of parts and it will be understood that the form illustrated is merely selected as one which has proven to be entirely satisfactory commercially, and I reserve the right to make all changes therein as fairly fall within the scope of the following claims.

I claim:

1. A chandelier fixture comprising a body having an annular band and an opening adjacent said band, a tubular arm projecting through said opening and having its inner end within the body located adjacent said band, and a bolt passing laterally through the band and the end of the arm and securing the parts together.

2. A chandelier fixture comprising a body having an annular band and an opening adjacent said band, a tubular arm projecting through said opening and having its inner ends swaged and located adjacent said band, and a bolt passing through the band and the swaged end of the arm and securing the parts together.

3. A chandelier fixture comprising a body having an opening therein, a tubular arm projecting through said opening, the inner end of said arm having shouldered front and rear faces, and a bolt passing through the wall of the body and said front and rear faces of the end of the arm and securing the parts together.

4. A chandelier fixture comprising a body having an opening therein, a tubular arm projecting through said opening, the inner end of said arm being swaged and having front and rear faces with centrally disposed depressions and adjacent shoulders, a bolt passing through the wall of the body and through said front and rear faces of the swaged end of the arm for securing the parts together, and a nut on the bolt engaging the shoulders of one of the faces of the swaged end.

JAMES WILLIAMSON.